US009718380B2

(12) United States Patent
Abro et al.

(10) Patent No.: US 9,718,380 B2
(45) Date of Patent: Aug. 1, 2017

(54) VEHICLE SEAT ASSEMBLY ACCOMMODATING A REAR FACING CHILD SEAT

(71) Applicant: Toyota Motor Engineering & Manufacturing North America, Inc., Erlanger, KY (US)

(72) Inventors: Lauren M. Abro, Farmington Hills, MI (US); Angela Piculi, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/686,533

(22) Filed: Apr. 14, 2015

(65) Prior Publication Data
US 2016/0304005 A1    Oct. 20, 2016

(51) Int. Cl.
| B60N 2/32 | (2006.01) |
| B60N 2/28 | (2006.01) |
| B60N 2/64 | (2006.01) |
| B60N 2/06 | (2006.01) |
| B60N 2/30 | (2006.01) |
| B60N 2/34 | (2006.01) |
| B60N 2/36 | (2006.01) |
| B60N 2/68 | (2006.01) |

(52) U.S. Cl.
CPC ............... *B60N 2/32* (2013.01); *B60N 2/065* (2013.01); *B60N 2/2806* (2013.01); *B60N 2/2809* (2013.01); *B60N 2/2812* (2013.01); *B60N 2/2863* (2013.01); *B60N 2/3011* (2013.01); *B60N 2/34* (2013.01); *B60N 2/36* (2013.01); *B60N 2/64* (2013.01); *B60N 2002/684* (2013.01)

(58) Field of Classification Search
CPC ...... B60N 2/22; B60N 2/3002; B60N 2/3081; B60N 2/3084; B60N 2/3086
See application file for complete search history.

(56) References Cited

U.S. PATENT DOCUMENTS

| 3,193,324 A * | 7/1965 | Stock ........................ B60N 2/22 297/342 |
| 4,541,654 A * | 9/1985 | Jonasson .................. B60N 2/20 280/801.1 |
| 4,555,135 A | 11/1985 | Freeland |
| 4,655,503 A | 4/1987 | Kamijo et al. |

(Continued)

*Primary Examiner* — Philip Gabler
(74) *Attorney, Agent, or Firm* — Christopher G. Darrow; Darrow Mustafa PC

(57) ABSTRACT

A vehicle seat assembly includes a back rest and a seat cushion that may be reconfigurable to alternatively form a forward facing adult seating surface and child seat mounting surface. The back rest may be provided in a substantially horizontal orientation to offer an extended lower leg support surface for a child's lower legs and feet while seated in a rear facing child seat. The vehicle seat assembly may include a support mechanism to interconnect the seat cushion to a vehicle, enabling selective longitudinal repositioning of the vehicle seat assembly with respect to fixed adjacent interior vehicle structure to establish a variable longitudinal clearance there-between. A rear facing child seat forming back rest and seat cushion portions may be carried by the child seat mounting surface of the vehicle seat assembly. The back rest may be removable from the vehicle seat assembly.

17 Claims, 4 Drawing Sheets

(56) References Cited

U.S. PATENT DOCUMENTS

| | | | | |
|---|---|---|---|---|
| 5,035,465 A | * | 7/1991 | Hanai | B60N 2/3084 |
| | | | | 297/216.11 |
| 5,409,293 A | * | 4/1995 | Nagasaka | B60N 2/26 |
| | | | | 297/105 |
| 5,564,780 A | * | 10/1996 | Presser | B60N 2/2878 |
| | | | | 297/238 |
| 5,568,959 A | | 10/1996 | Weber et al. | |
| 5,833,203 A | * | 11/1998 | Denis | B60N 2/01525 |
| | | | | 248/220.22 |
| 5,913,533 A | | 6/1999 | Lucas, Jr. et al. | |
| 5,971,479 A | | 10/1999 | Jacquemot et al. | |
| 6,045,190 A | | 4/2000 | Ward et al. | |
| 6,053,569 A | * | 4/2000 | Flyborg | B60N 2/06 |
| | | | | 297/238 |
| 6,059,358 A | | 5/2000 | Demick et al. | |
| 6,199,945 B1 | * | 3/2001 | Kim | B60N 2/0284 |
| | | | | 296/64 |
| 6,494,531 B1 | | 12/2002 | Kim | |
| 6,502,901 B2 | | 1/2003 | Deptolla | |
| 6,991,285 B1 | * | 1/2006 | Hemenway | B60N 2/203 |
| | | | | 296/65.01 |
| 7,066,536 B2 | | 6/2006 | Williams et al. | |
| 7,159,941 B2 | | 1/2007 | Thomas | |
| 7,458,635 B2 | * | 12/2008 | Mendis | B60N 2/206 |
| | | | | 297/112 |
| 7,837,264 B2 | * | 11/2010 | van der Bijl | B60N 2/2806 |
| | | | | 297/250.1 |

\* cited by examiner

VEHICLE SEAT ASSEMBLY ACCOMMODATING A REAR FACING CHILD SEAT

TECHNICAL FIELD

The present disclosure generally relates to seat assemblies for vehicles, and more particularly, to the selective mounting of child seats to adult seats.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Child passenger safety laws and restraint requirements may vary in different jurisdictions based on age, weight, and height. Conventional infant seats are frequently at least partially immobilized, relative to an integrated, adult accommodating seat of a the vehicle, by extending a seat belt of the vehicle through at least a portion of the infant seat and/or interconnecting one or more support straps of the infant seat with a frame of the adult accommodating seat, or other structure of the vehicle.

Rearward facing seating is a primary carrying mode for infants and, to a lesser degree, toddlers riding in vehicles. Rearward facing seating allows for the distribution of inertia forces, acting on a child during a frontal impact, over a larger area against the seat back, as opposed to concentrating the force through seatbelts. Although rearward facing seating is widely required by state laws and is believed to be a superior mode, it is often difficult for children at older ages to continue with this type of seating because of their height. One problem arises because the feet of tall infants and young toddlers touch the rear seat back; the child must bend his or her knees, which can be uncomfortable.

Accordingly, it would be desirable to provide a seat configuration that allows comfortable seating for tall infants and toddlers by accommodating their relatively longer leg length.

SUMMARY

This section provides a general summary of the disclosure, and is not a comprehensive disclosure of its full scope or all of its features.

In various aspects, the present teachings provide a vehicle seat assembly selectively reconfigurable to alternately form a forward facing adult seat and a child seat mounting surface. The vehicle seat assembly may include a back rest and a seat cushion. The seat cushion may be configured to serve as the child seat mounting surface. In various aspects, the back rest may be selectively repositionable between a first orientation to provide the forward facing adult seat, and a second, substantially horizontal orientation to provide an extended lower leg support surface for a child's lower legs and feet while seated in a rear facing child seat. The back rest may also be selectively removable from the vehicle seat assembly.

According to another aspect of the present disclosure, a vehicle seat assembly includes a back rest and a seat cushion that are selectively reconfigurable to alternately form a forward facing adult seating surface and a child seat mounting surface. The vehicle seat assembly may include a rear facing child seat carried by the child seat mounting surface. In various aspects, the back rest of the vehicle seat assembly forms an extended leg support surface for a child's lower legs and feet while seated in the rear facing child seat. The back rest may also be selectively removable from the vehicle seat assembly. When removed, a horizontal upper surface of the seat cushion may provide the child seat mounting surface and the seat cushion may form a rearwardly facing bolster longitudinally spaced from an opposed forward edge surface of a fixed adjacent interior vehicle structure by a sufficient dimension to provide longitudinal clearance for a rearwardly facing child's lower legs and feet while seated in the rear facing child seat.

According to yet another aspect the present disclosure, a second row vehicle seat assembly is provided including a seat cushion and a removable back rest. The back rest may be selectively reconfigurable between a first position and a second position to alternately form a forward facing adult seating surface when in the first position, and an extended leg support surface when in the second position. A rear facing child seat may be carried by the child seat mounting surface of the vehicle seat assembly. A support mechanism may be provided, configured to fixedly interconnect the seat cushion to a host vehicle. The support mechanism may enable a selective longitudinal repositioning of the vehicle seat assembly with respect to a fixed adjacent interior vehicle structure to establish a variable longitudinal clearance there-between.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
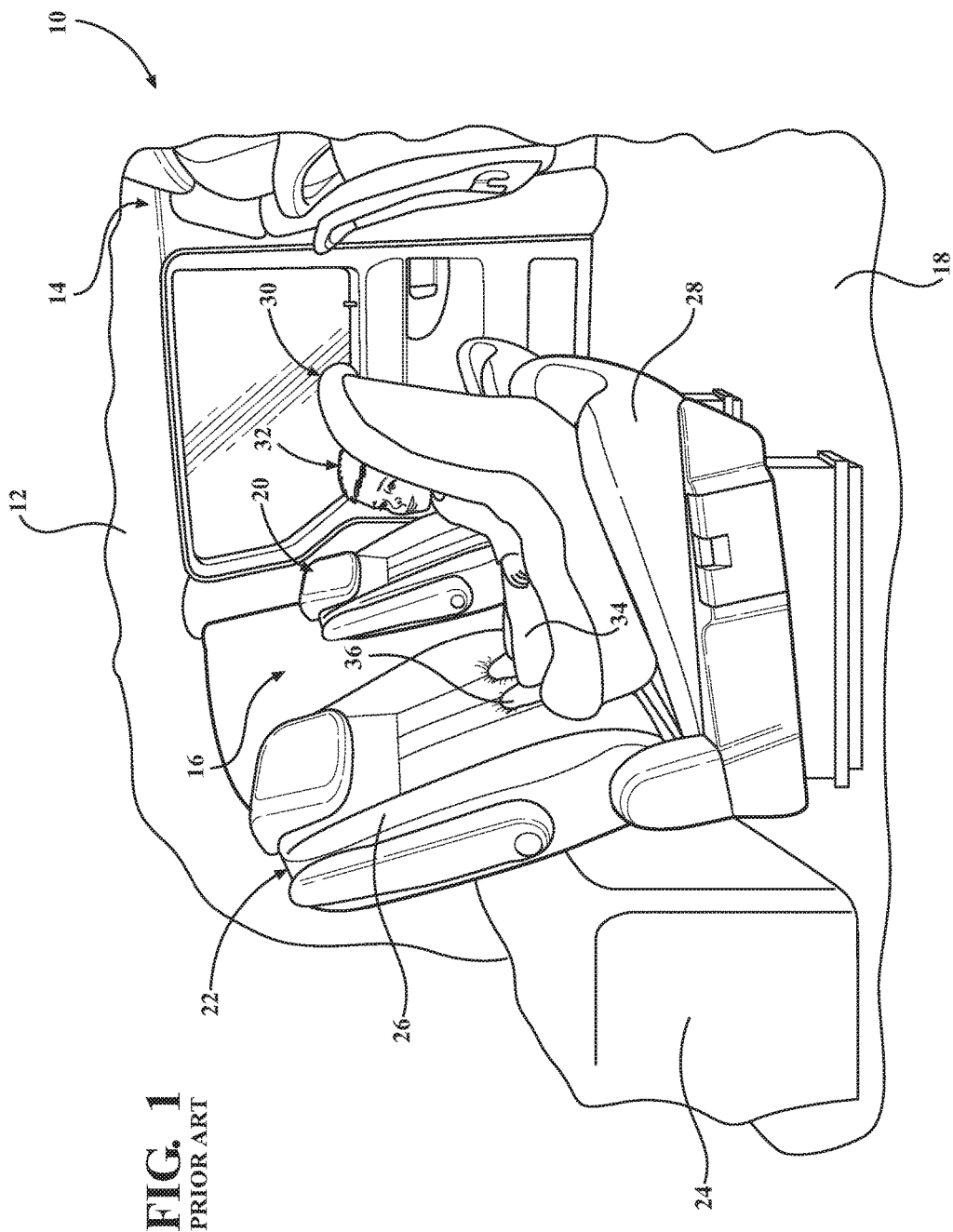
FIG. 1 is a side perspective view of a rear facing child seat mounted to a rear seat of a vehicle illustrating a child occupant's feet in contact with the back rest of the rear seat.

It should be noted that the figures set forth herein are intended to exemplify the general characteristics of materials, methods, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

In the following detailed description, reference is made to the accompanying drawings, which form a part thereof, and in which is shown by way of illustrating specific embodiments in which the disclosure may be practiced. In this regard, directional terminology, such as "top," "bottom," "front," "back," "leading," "trailing," etc. is used with reference to the orientation of the figures being described. Because the components of embodiments can be positioned in a number of different orientations, the directional terminology is used for purposes of illustration and is not limiting. It should be understood that other embodiments may be utilized, and structural or logical changes may be made without departing from the scope of the present disclosure. The following detailed description, therefore, is not to be taken in a limiting sense, and the scope of the present disclosure is defined by the appended claims.

For purposes of providing a non-limiting definition and to enable clear understanding of the present disclosure, "longitudinal" means parallel to the direction of the Y axis, "lateral" means parallel to the direction of the X axis, and "vertical" means parallel to the direction of the Z axis.

Regardless of the particular models used, the designs of child seating apparatuses has generally required parents/guardians of children to purchase an infant seat, a toddler seat, and a booster seat to accommodate the growth of the child. Once it is determined that a child has outgrown (e.g., is too tall and/or heavy to be appropriately accommodated by) an above-mentioned infant seat, the infant seat is typically removed from the vehicle and replaced by a toddler seat to sufficiently restrain a toddler and enable the toddler to ride within the vehicle. Generally similar to conventional infant seats, conventional toddler seats are at least partially immobilized, relative to an integrated, adult accommodating seat of a vehicle, by extending a seat belt of the vehicle through at least a portion of the toddler seat and/or by interconnecting one or more support straps of the toddler seat with a frame of the vehicle. The booster seats are also similarly fastened into the vehicle using a seat belt and/or one or more support straps of the booster seat.

One disadvantage of the evolution of child seat types through the growth cycle of a given child is that the rear-facing configuration almost always employed for infants is abandoned in favor of forward facing configurations frequently for toddlers and almost always for young children. This evolution results from typical rapid and irregular growth spurts of children, making them more adult-like in their seating configuration needs, as well as increased social interaction with adults typically located in the front seating positions of the vehicle.

The present disclosure provides supplemental leg room and support for a child positioned in a rear facing toddler or child seat secured to a second row (rear adult) vehicle seat assembly. The second row vehicle seat assembly can be a bucket type seat including a seat back, or back rest, affixed adjacent to a seat cushion. In various aspects, the back rest can recline about 90 degrees between a substantially vertical position and a rearward horizontal position, or about 90 degrees between a substantially vertical position and a forward horizontal position. Additionally, the back rest can be temporarily removed during use of the rear facing toddler or child seat. This arrangement will accommodate larger children who are still required to sit in rear facing seats due to anticipated future regulations.

Referring to FIG. 1, a vehicle 10 may include a passenger compartment 12 enclosing a front row of vehicle seat assemblies 14 and a second row of vehicle seat assemblies 16 supported on an appropriate floor panel 18. Each row of vehicle seat assemblies 14 and 16 can include bench-type seating, split bench-type seats, or individual bucket-type seats. Larger vehicles, such as passenger vans and suburban utility vehicles (e.g., SUVs) can include a third or even a fourth row of vehicle seat assemblies, not illustrated.

For purposes of the present disclosure, the vehicle 10 is illustrated having a second row vehicle seat assembly 16 consisting of a laterally opposed pair of single passenger bucket-type seats 20 and 22 disposed within the passenger compartment 12 longitudinally intermediate the front row of vehicle seat assemblies 14 and a rear bulkhead 24, separating the passenger compartment 12 from a vehicle trunk, if so equipped. In various aspects, the rear bulkhead 24 may be representative of a third row of vehicle seat assemblies or other fixed interior structure.

The passenger-side bucket seat 22 is shown having an upstanding back rest 26 operatively assembled with a substantially horizontal, forwardly directed seat cushion 28. A rear facing infant seat 30 is mounted to the bucket seat 22, compressively loaded downwardly upon the seat cushion 28 and longitudinally rearwardly against the back rest 26. The rear facing infant seat 30 may be secured to the bucket seat 22 by seat belts or supplemental restraints, not illustrated. A child 32 occupying the rear facing infant seat 30 is illustrated as having outgrown the rear facing infant seat 30 such that the child's legs 34 extend rearwardly beyond the end of the rear facing infant seat 30, and the child's feet 36 are pressed against a forward facing front surface of the back rest 26 of the bucket seat 22, which can be uncomfortable for the child 32.

Figure 2:
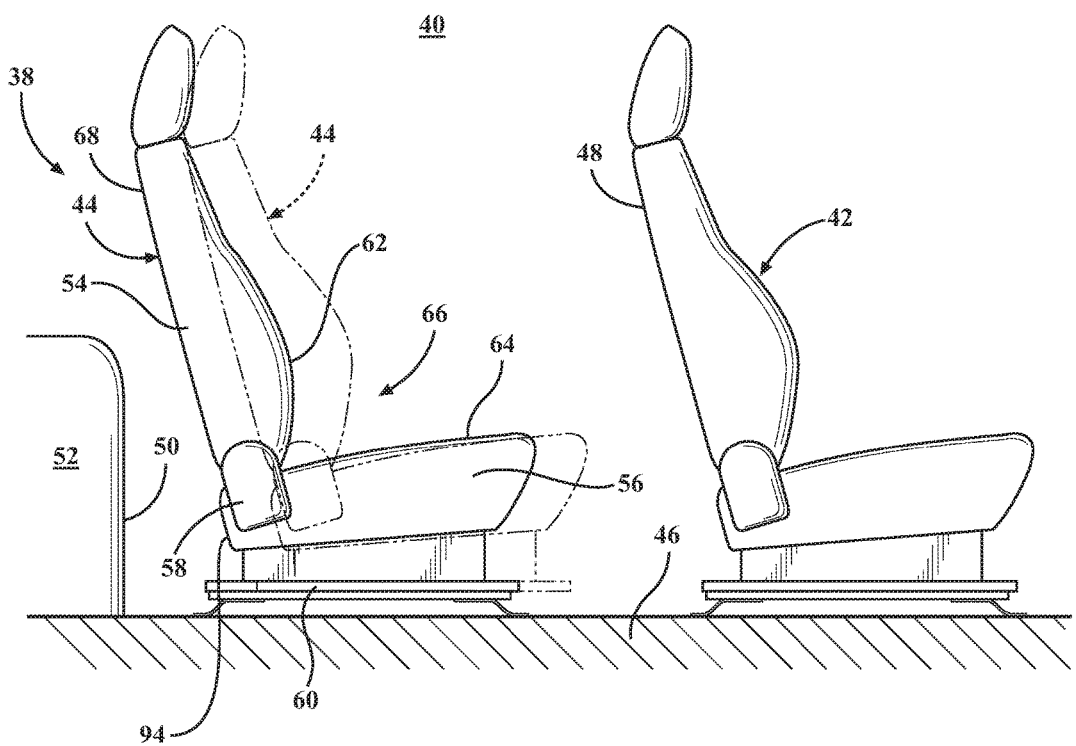
FIG. 2 is a side plan view including a rear seat of a vehicle that is configured for selective longitudinal adjustment with respect to other seats and/or a rear bulkhead of the vehicle.

Referring to FIG. 2, an exemplary vehicle 38 may include a passenger compartment 40 enclosing a front row vehicle seat assembly 42 and a second row vehicle seat assembly 44 commonly supported by a vehicle floor panel 46. The second row vehicle seat assembly 44 may be longitudinally positioned between a rear facing surface 48 of the front row vehicle seat assembly 42 and a forward facing surface 50 of a rear bulkhead 52. The second row vehicle seat assembly 44 includes a back rest 54 that may be operatively interconnected to a seat cushion 56 by a releasable, pivotal hinge mechanism 58, or the like. When oriented as illustrated in FIG. 2, a forward facing front surface 62 of the back rest 54 and an upwardly facing surface 64 of the seat cushion 56 together define an adult seating surface 66.

The seat cushion 56 of the second row vehicle seat assembly 44 may be interconnected to the vehicle floor panel 46 by a support mechanism 60 that may be selectively releasable to enable bidirectional longitudinal repositioning of the second row vehicle seat assembly 44, as illustrated in phantom.

Figure 3:
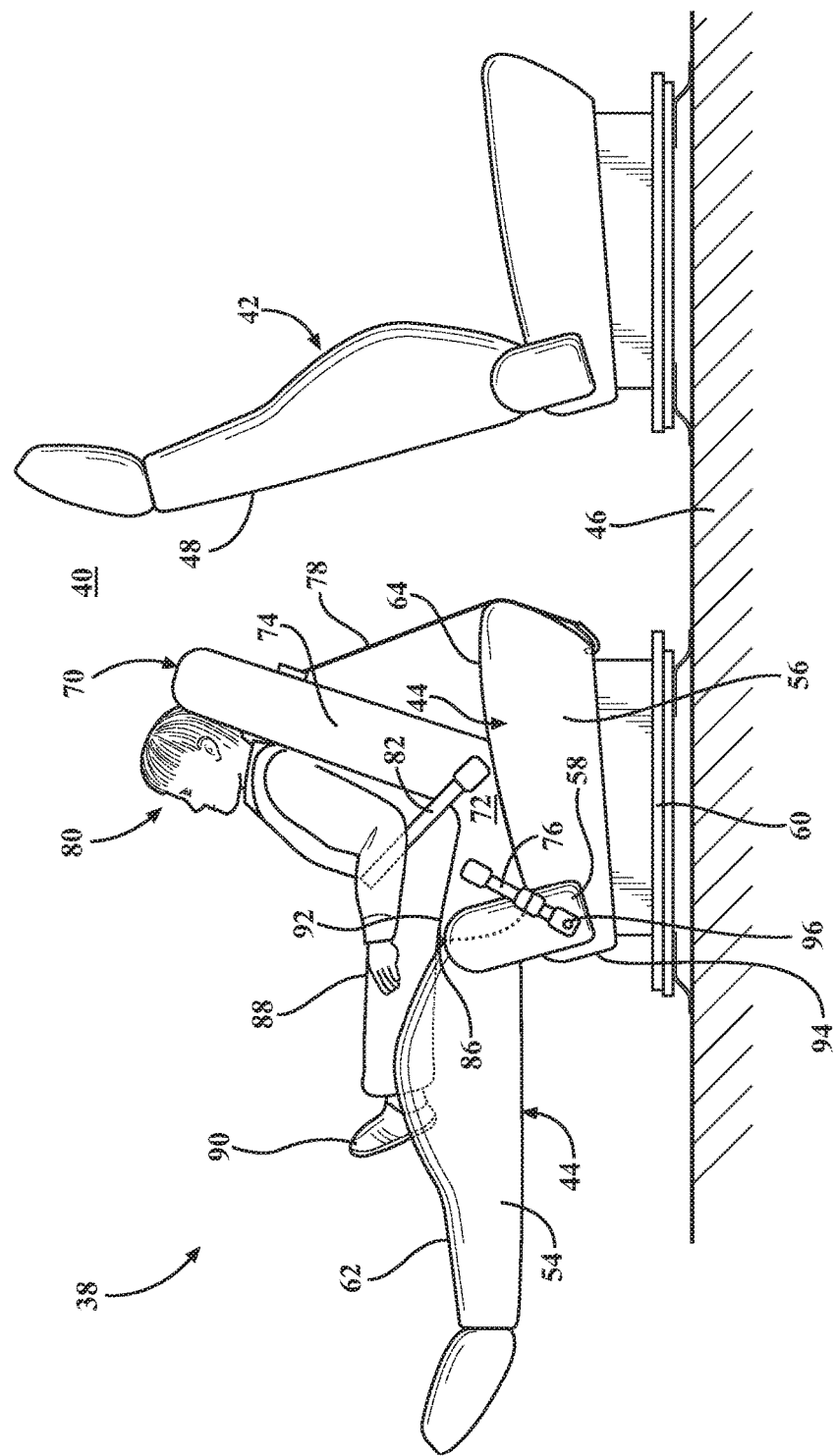
FIG. 3 is a side plan view of one embodiment of the present disclosure wherein the back rest of the rear seat is folded rearwardly to provide a substantially horizontal extended leg support surface for the rear facing child seat.

Referring to FIG. 3, the back rest 54 of the second row vehicle seat assembly 44 is repositioned by an approximate 90 degrees counterclockwise (rearward) rotation from a substantially vertical orientation (as illustrated in FIG. 2) to a substantially horizontal orientation presenting the front surface 62 for use as an extended leg support surface for a child occupant's 80 lower legs and feet 90. A rear facing toddler/child seat 70 is configured to form a seat cushion portion 72. The seat cushion portion 72 may be compressively loaded against the upwardly facing surface 64 (i.e., the child seat mounting surface) of the supporting seat cushion 56 by safety belts or tethers so as to be substantially aligned with the back rest 54. By way of example, FIG. 3 shows a first tether 76 extending between the seat cushion portion 72 and the hinge mechanism 58, and a second tether 78 extending between the back rest portion 74 and the seat cushion 56. A child occupant 80 of the toddler/child seat 70 may be secured by an integral seat belt system 82, or the like.

The toddler/child seat 70 may be dimensioned and positioned in application to align the nominal child occupant's 80 legs atop the seat cushion portion 72 of the toddler/child seat 70, and to enable the lower leg portions and feet 90 of an out-sized child occupant 80 to extend freely rearwardly atop the extended leg support surface formed by the front surface 62 of the back rest 54. Thus, the legs of the out-sized child occupant 80 are supported along their entire extent by either the seat cushion portion 72 of the toddler/child seat 70 or the extended leg support surface formed by the front surface 62 of the back rest 54. Preferably, the feet 90 of the out-sized child occupant 80 will not contact any fixed barrier.

As an alternative to the embodiment of FIG. 3, the back rest 54 of the second row vehicle seat assembly 44 can also be repositioned through a substantially 90 degrees clockwise (forward) rotation from a vertical orientation (in FIG. 2) to a horizontal orientation presenting a back surface 68 as a mounting surface for a toddler/child seat 70 (not shown). In this configuration, the seat cushion portion 72 may be compressively loaded against the back surface 68 (i.e., the child seat mounting surface) of the supporting back rest 54 by appropriate tethers.

Figure 4:
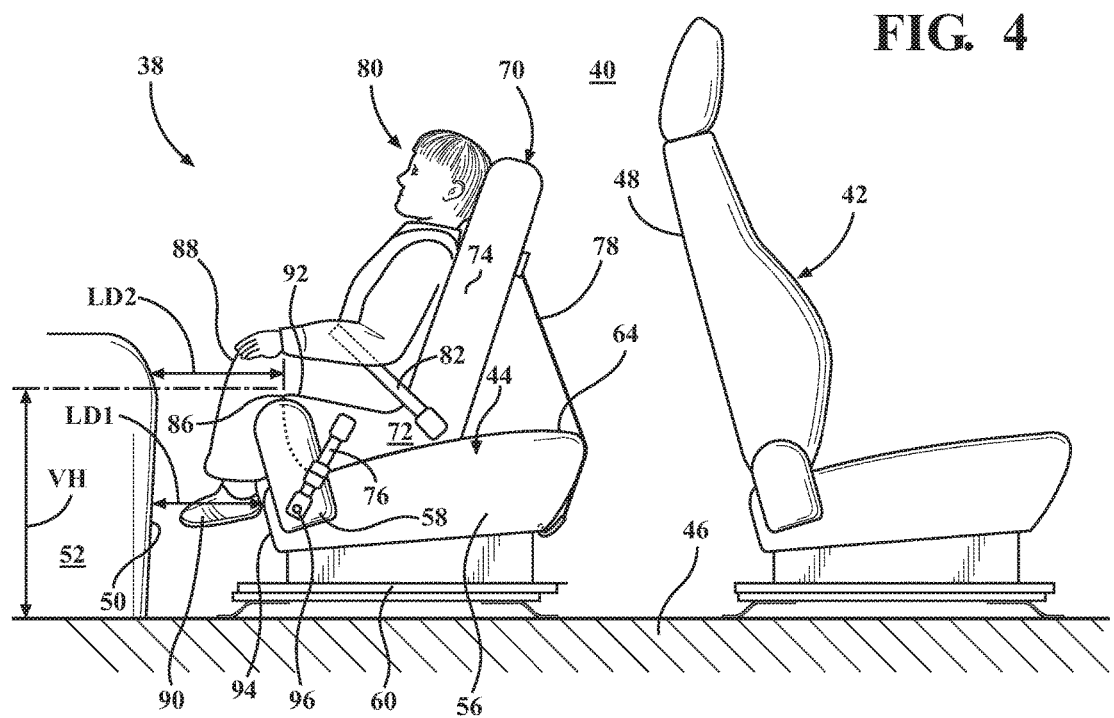
FIG. 4 is a side view of another embodiment of the present disclosure wherein the back rest of the rear seat is removed, exposing a rear edge surface (e.g., bolster) of the seat cushion to provide a substantially vertical extended leg support surface for the rear facing child seat.

Referring to FIG. 4, the back rest 54 of the second row vehicle seat assembly 44 may also be temporarily removed. In various aspects, one may use the hinge mechanism 58 as an attachment point 96 for the toddler/child seat 70. As shown, the seat cushion portion 72 of the toddler/child seat 70 may be compressively loaded against the upwardly facing surface 64 (i.e., the child seat mounting surface) of the supporting seat cushion 56 by the first tether 76 extending between the seat cushion portion 72 and the child seat attachment point 96 formed by the hinge mechanism 58, and the second tether 78 extending between the child seat back rest portion 74 and the seat cushion 56. The child occupant 80 of the toddler/child seat 70 may be secured by an integral seat belt system 82. In various aspects, the second row vehicle seat assembly 44 may include at least one tether that is selectively reconfigurable to serve as either (1) a lap-type seat belt when the back rest 54 is in a substantially vertical orientation to provide the forward facing adult seat, or (2) a harness for the rear facing toddler/child seat 70 when the back rest 54 is in the substantially horizontal orientation, or removed from the second row vehicle seat assembly 44.

Figure 5:
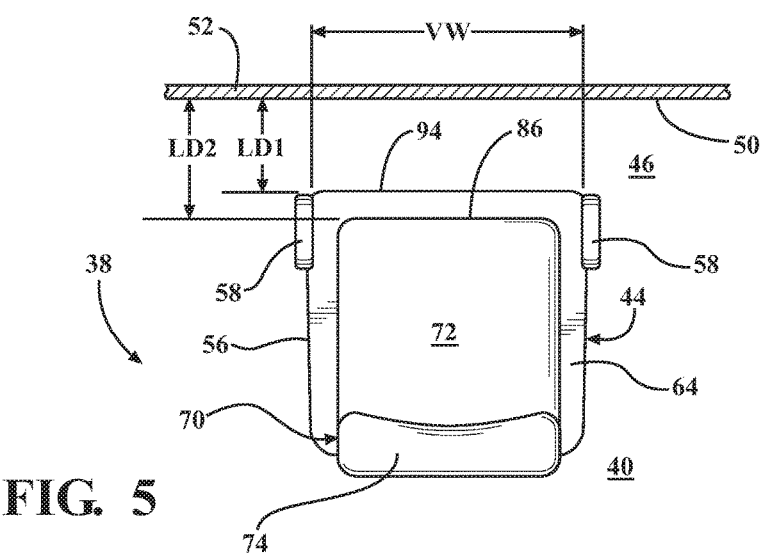
FIG. 5 is a top view of one embodiment of the present disclosure illustrating the longitudinal and lateral leg/foot space afforded between the rear facing child seat and the rear bulkhead of the vehicle.

Referring to FIGS. 4 and 5, in various aspects, the seat cushion 56 may form an edge portion 94 (e.g., bolster) that faces, and is spaced from, the forward facing surface 50 of the rear bulkhead 52 (or third row seat) by a longitudinal depth dimension designated by an arrow "LD1" when the second row vehicle seat assembly 44 is displaced longitudinally forward in anticipation of the installation of the toddler/child seat 70. Similarly, the seat cushion portion 72 of the toddler/child seat 70 may form an edge portion 86 that faces, and is spaced from, the forward facing surface 50 of the rear bulkhead 52 by a longitudinal depth dimension designated by an arrow "LD2" when mounted atop the seat cushion 56 of the second row vehicle seat assembly 44. FIG. 5 further illustrates a width dimension of an available volume as designated by an arrow "VW" extending the maximum width of the second row vehicle seat assembly 44.

In various aspects, the toddler/child seat 70 may be dimensioned and positioned to align and support the nominal child occupant's 80 legs atop the seat cushion portion 72 of the toddler/child seat 70. Once the child occupant's 80 knee portion 88 approaches the edge portion 86 of the seat cushion portion 72, the dimensions should enable the extended lower leg portions and feet 90 of an out-sized child occupant 80 to depend freely vertically downwardly within the space created between the second row vehicle seat assembly 44 and the rear bulkhead 52. The available vertical height dimension is designated by an arrow "VH" extending between the upper surface 92 of the seat cushion portion 72 and the vehicle floor panel 46. The edge portion 94 of the seat cushion 56 can serve to support and absorb frontal impact loads imposed on the lower legs of the child occupant 80. In various aspects, the vertical height, lateral width, and longitudinal depth may be constant for a given fixed positioning of the vehicle seat assembly with respect to the interior vehicle structure, defining a clearance volume between the second row vehicle seat assembly 44 and the fixed interior vehicle structure 52.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A vehicle seat assembly, comprising:
    a seat cushion, the seat cushion forming an upwardly facing surface configured to alternatively provide part of an adult seating surface and a child seat mounting surface; and
    a back rest forming a front surface, wherein the back rest is selectively:
        (i) repositionable between a first orientation in which the front surface provides a forward facing part of the adult seating surface to form a forward facing adult seat, and a second, substantially horizontal orientation in which the front surface provides an upwardly facing extended leg support surface substantially continuously with an upper surface of a primary leg support surface formed by a rear facing child seat carried by the upwardly facing surface of the seat cushion; and
        (ii) removable from the vehicle seat assembly.

2. The vehicle seat assembly of claim 1, further comprising a support mechanism configured to interconnect the seat cushion to a host vehicle, and enable selective longitudinal repositioning of the vehicle seat assembly with respect to a fixed adjacent interior vehicle structure to establish a variable longitudinal clearance there-between.

3. The vehicle seat assembly of claim 2, wherein the vehicle seat assembly is longitudinally spaced from an opposed forward edge surface of the interior vehicle structure by a clearance volume having a vertical height, a lateral width, and a longitudinal depth.

4. The vehicle seat assembly of claim 3, wherein the vertical height, the lateral width, and the longitudinal depth are constant for a given fixed longitudinal positioning of the vehicle seat assembly with respect to the interior vehicle structure.

5. The vehicle seat assembly of claim 3, wherein the vertical height extends from a floor panel of the host vehicle to the upper surface of the primary leg support surface formed by the rear facing child seat.

6. The vehicle seat assembly of claim 1, further comprising a pivotal hinge mechanism configured to releasably interconnect the back rest with the seat cushion.

7. The vehicle seat assembly of claim 6, wherein the pivotal hinge mechanism provides an attachment point for the rear facing child seat.

8. The vehicle seat assembly of claim 1, wherein the primary leg support surface has at least one touch point, and the seat cushion forms a rearwardly facing bolster forming a rearwardly facing extended leg support surface when the back rest is removed from the vehicle seat assembly with at least one touch point in a same substantially vertical plane as the primary leg support surface's at least one touch point.

9. The vehicle seat assembly of claim 1, wherein the vehicle seat assembly is a single passenger vehicle seat assembly.

10. A vehicle seat assembly, comprising:
a seat cushion, the seat cushion forming an upwardly facing surface configured to alternatively provide a child seat mounting surface and part of an adult seating surface, and a rearwardly facing bolster forming a rearwardly facing extended leg support surface with at least one touch point;
a back rest forming a front surface, the back rest removed from the vehicle seat assembly, and selectively interconnectable with the seat cushion in a position in which the front surface provides a forward facing part of the adult seating surface to form a forward facing adult seat; and
a rear facing child seat carried by the child seat mounting surface, the rear facing child seat forming a rearwardly facing primary leg support surface with at least one touch point in a same substantially vertical plane as the extended leg support surface's at least one touch point, whereby the primary leg support surface's at least one touch point and the extended leg support surface's at least one touch point support a child's lower legs and feet substantially vertically while seated in the rear facing child seat.

11. The vehicle seat assembly of claim 10, wherein the rearwardly facing bolster is longitudinally spaced from an opposed forward edge surface of a fixed adjacent interior vehicle structure by a sufficient dimension, with the back rest removed from the vehicle seat assembly, to provide longitudinal clearance and the extended leg support surface.

12. The vehicle seat assembly of claim 10, further comprising a pivotal hinge mechanism configured to releasably interconnect the back rest with the seat cushion.

13. The vehicle seat assembly of claim 12, wherein the pivotal hinge mechanism provides an attachment point for the rear facing child seat.

14. The vehicle seat assembly of claim 10, further comprising a support mechanism configured to interconnect the seat cushion to a host vehicle, and enable selective longitudinal repositioning of the vehicle seat assembly with respect to a fixed adjacent interior vehicle structure to establish a variable longitudinal clearance there-between.

15. A second row vehicle seat assembly, comprising:
a seat cushion forming an upwardly facing surface configured to alternatively provide a child seat mounting surface and part of an adult seating surface;
a rear facing child seat carried by the upwardly facing surface of the seat cushion, the rear facing child seat forming a primary leg support surface with at least one touch point; and
a back rest forming a front surface, the back rest in a substantially horizontally oriented position in which the front surface provides an upwardly facing extended leg support surface with at least one touch point in a same substantially horizontal plane as the primary leg support surface's at least one touch point, and selectively repositionable between the substantially horizontally oriented position and an alternative position in which the front surface provides a forward facing part of the adult seating surface to form a forward facing adult seat.

16. The second row vehicle seat assembly of claim 15, wherein the back rest is selectively removable from the second row vehicle seat assembly, and the seat cushion forms a rearwardly facing bolster longitudinally spaced from an opposed forward edge surface of a fixed adjacent interior vehicle structure by a sufficient dimension, when the back rest is removed from the second row vehicle seat assembly, to provide longitudinal clearance and a rearwardly facing second extended leg support surface with at least one touch point, with the second extended leg support surface's at least one touch point in a same substantially vertical plane as a second at least one touch point on the primary leg support surface.

17. The second row vehicle seat assembly of claim 15, further comprising a support mechanism configured to interconnect the seat cushion to a host vehicle, and enable selective longitudinal repositioning of the second row vehicle seat assembly with respect to a fixed adjacent interior vehicle structure to establish a variable longitudinal clearance there-between.

* * * * *